Dec. 10, 1929.  W. L. CHAMPION  1,739,439

AXLE BEARING

Filed Aug. 2, 1928

Inventor
William L. Champion
By Vernon E. Hodges
his Attorney

Patented Dec. 10, 1929

1,739,439

UNITED STATES PATENT OFFICE

WILLIAM L. CHAMPION, OF MUSKOGEE, OKLAHOMA, ASSIGNOR TO MUSKOGEE IRON WORKS, A CORPORATION OF OKLAHOMA

AXLE BEARING

Application filed August 2, 1928. Serial No. 296,925.

This invention relates to an improvement in axle bearings.

The object of the invention is to provide bearings for the axles of a trailer or other similar type of vehicle, which will act to support the independent axles as a unit and allow their removal from the axle housing as such. At the same time, provision is made for packing the axle housing full of lubricant and holding it in place by means of suitable packing so as to exclude the dust, dirt and all foreign matter.

Figure 1:
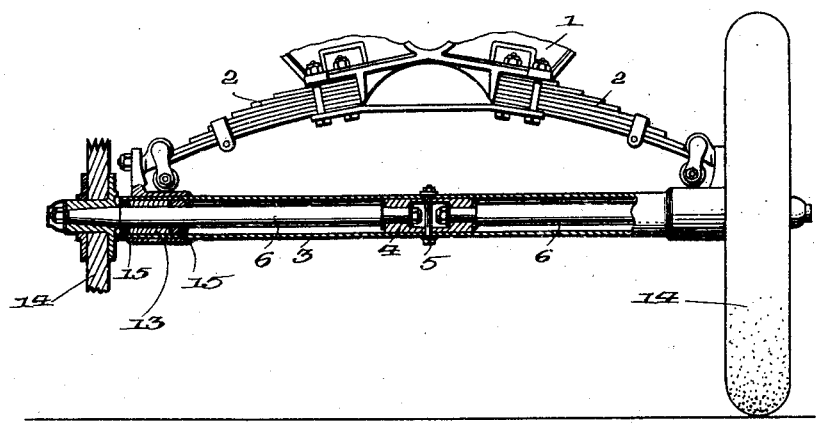
Fig. 1 is a side elevation partly in section illustrating the invention applied.

The numeral 1 designates the trailer structure, which is supported by the springs 2 upon the axle housing 3, as shown in Fig. 1.

Figure 2:
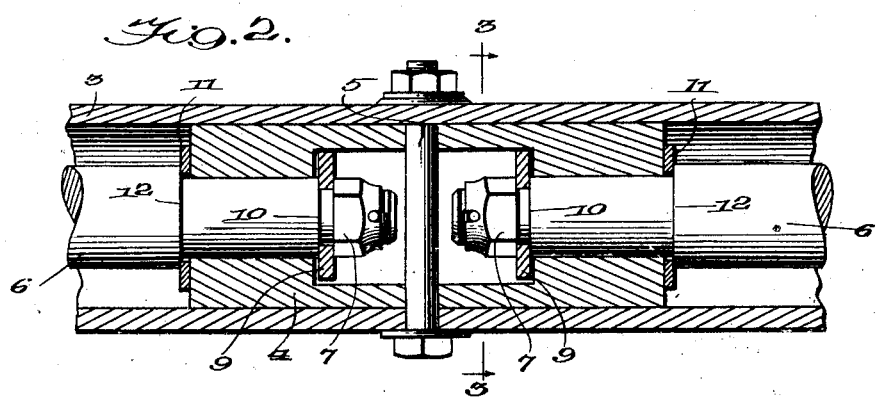
Fig. 2 is an enlarged sectional view through the bearing block showing the axles secured therein.
Figure 3:
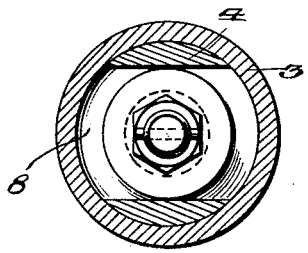
Fig. 3 is a transverse sectional view on the line 3—3 of Fig. 2.
Figure 4:
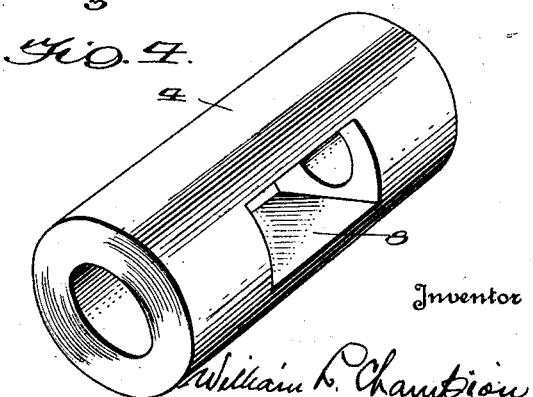
Fig. 4 is a perspective view of the bearing block.

A bearing block 4 is secured in the housing by means of a single bolt 5, which extends through the housing. The bearing block 4 has the inner ends of the axles 6 secured therein, as shown in Fig. 2, and held in place by means of the lock nuts 7 screwed on to the inner ends of the axles 6. A side opening 8 is provided through the bearing block 4, as shown in Fig. 4, to gain access to the lock nuts 7 for turning the same to secure them on or remove them from the ends of the bolts.

Thrust washers 9 are interposed between the lock nuts 7 and shoulders 10 formed in the inner ends of the axles 6, which thrust washers 9 are extended sufficiently to engage the ends of the opening 8 of the bearing block so as to absorb the shock which may be imparted to one of the axles without distributing it to the other. For the same purpose, additional thrust washers 11 are interposed between shoulders 12 on the axles 6 and the ends of the bearing block 4. The outer ends of the axles 6 are mounted in the usual roller bearings 13 which support the axles in properly spaced relation from the housing 3. Wheels 14 are secured upon the extreme ends of the axles 6.

As shown in Fig. 1, the ends of the housing 3 are closed by means of packing 15, which is held in place upon opposite sides of the roller bearings 13, so as to allow of the housing being approximately filled with a suitable lubricant and to hold the lubricant in the housing while at the same time preventing any dust, dirt or foreign matter from finding its way into it. This packing 15 may be held in place by suitable spring clips fitted into the extreme ends of the housing 3.

The invention is shown as applied to a vehicle trailer in which the stub axles 6 extend only to the middle of the axle housing where they are held in place by the bearing block 4, which in turn is secured by a single bolt. If it should be necessary to remove the axles for repairing any of the parts thereof, these may be removed as a unit merely by removing one of the wheels and the bolt 5, after which the axles may slide through the housing and be removed therefrom for repair or replacement. The thrust washers 9 and 11, which are connected with the inner ends of the axles, serve to absorb any shocks which may be imparted to either of them, thus preventing distribution to the other parts.

The packing that is held in place in the outer ends of the axle housing about the axles holds the lubricant in and prevents any foreign matter from gaining access to the lubricant, which would destroy its effectiveness.

I claim:—

In a vehicle of the character described, the combination of an axle housing, axles mounted therein, a bearing block slidably fitted into the axle housing and receiving and supporting the inner ends of the axles, said bearing block having a transverse opening therein for gaining access to the inner ends of the axles, means located in said transverse opening for securing the axles in the bearing block, and a bolt for holding the bearing block in proper position within the housing.

In testimony whereof I affix my signature.

WILLIAM L. CHAMPION.